United States Patent
Ueno

(10) Patent No.: US 7,291,090 B2
(45) Date of Patent: Nov. 6, 2007

(54) MOTOR TORQUE CONTROL SYSTEM FOR VEHICLE

(75) Inventor: Munetoshi Ueno, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 80 days.

(21) Appl. No.: 10/822,818

(22) Filed: Apr. 13, 2004

(65) Prior Publication Data

US 2004/0204285 A1    Oct. 14, 2004

(30) Foreign Application Priority Data

Apr. 14, 2003   (JP) ............... 2003-108601

(51) Int. Cl.
*B60W 10/08* (2006.01)
(52) U.S. Cl. ............................. 477/4; 477/9
(58) Field of Classification Search ............ 477/2, 477/3, 4, 7, 9
See application file for complete search history.

(56) References Cited

U.S. PATENT DOCUMENTS

| | | | |
|---|---|---|---|
| 6,081,042 A * | 6/2000 | Tabata et al. | 290/45 |
| 6,083,138 A * | 7/2000 | Aoyama et al. | 477/5 |
| 6,083,139 A * | 7/2000 | Deguchi et al. | 477/5 |
| 6,434,475 B2 | 8/2002 | Kaneko | |
| 6,466,860 B2 | 10/2002 | Kaneko | |
| 6,799,109 B2 * | 9/2004 | Nakamori et al. | 701/54 |
| 6,817,964 B2 * | 11/2004 | Kayukawa et al. | 477/15 |

FOREIGN PATENT DOCUMENTS

| | | | |
|---|---|---|---|
| EP | 952029 | * | 10/1999 |
| JP | 2001-020777 A | | 1/2001 |
| JP | 2001-103618 A | | 4/2001 |
| JP | 2001-233088 A | | 8/2001 |
| JP | 2001-234838 A | | 8/2001 |
| JP | 2002-142310 A | | 5/2002 |

* cited by examiner

*Primary Examiner*—Ha D. Ho
(74) *Attorney, Agent, or Firm*—Foley & Lardner LLP

(57) ABSTRACT

A motor torque control system for a vehicle equipped with a drive torque generating motor is comprised of a vehicle speed detector, an accelerator opening detector, a brake depression detector and a control unit. The control unit rapidly brings a motor torque to zero when a vehicle speed is lower than a predetermined speed, when an accelerator opening is substantially zero, and when a brake depression quantity is increasing, and generates the motor torque according to the brake depression quantity when the brake depression quantity is deceasing.

9 Claims, 5 Drawing Sheets

MOTOR TORQUE CONTROL SYSTEM FOR VEHICLE

BACKGROUND OF THE INVENTION

The present invention relates to a motor torque control system for a vehicle equipped with a drive torque generating motor.

Electric vehicles and hybrid electric vehicles are capable of freely controlling a motor torque, and therefore there are capable of stopping the generation of the motor torque when the vehicle stops running to decrease the energy consumption. Further, when the hybrid electric vehicle stops running, an idling stop for stopping an engine is executed and the generation of the motor torque is also stopped to decrease the energy consumption. That is, these electric vehicle and hybrid electric vehicle do not generate a creep torque caused by an idling engine revolution although such a creep torque is normally generated by a vehicle equipped with a known automatic transmission with a torque converter. On the other hand, such a creep torque enables an extremely low speed running available for parking a vehicle at a predetermined space and running the vehicle in a traffic jam, and enables suppressing a back movement during a starting on an upslope. Therefore the utilization of creep torque improves a drivability. Since the great majority of vehicles have functions of a creep running, almost drivers feel that a creep running of a vehicle is an essential function.

Although a creep running of an electric vehicle or hybrid electric vehicle is effectively executed by driving a motor, generation of a motor torque under a brake depression state uselessly consumes electric power. Therefore, it is preferable that the generation of the motor torque becomes zero under the brake depression state. However, this method has a possibility of generating a back movement on a sheep upslope if a generation of a creep torque just after the brake releasing is delayed.

Japanese Published Patent Application No. 2001-103618 discloses a control system of achieving both of decreasing an electric power consumption and an upslope starting performance, by decreasing the motor torque according to the increasing of a depression quantity of a brake.

SUMMARY OF THE INVENTION

However, this known control system requires to largely depress a brake pedal for a predetermined time in order to bring a motor torque to zero.

It is therefore an object of the present invention to provide an improved motor torque control system which achieves all advantages of decreasing an electric power consumption, of improving an upslope starting performance, and of bringing a motor torque to zero under suitable situations.

An aspect of the present invention resides in a motor torque control system for a vehicle equipped with a motor, which comprises a vehicle speed sensor that detects a vehicle speed; an accelerator opening detector that detects an opening of an accelerator of the vehicle; a brake depression detector that detects a brake manipulated quantity (brake manipulated quantity) indicative of a depression state of a brake of the vehicle; and a control unit that is coupled to the vehicle speed sensor, the accelerator opening detector, and the brake depression detector. The control unit is arranged to bring a motor torque of the motor to zero when the vehicle speed is lower than a predetermined speed, when the accelerator opening is substantially zero, and when the brake depression state is set at a braking increasing state of increasing a braking force of the vehicle, and to generate the motor torque according to the brake manipulated quantity when the brake depression state is set at a braking decreasing state of decreasing a braking force of the vehicle.

Another aspect of the present invention resides in a motor torque control system for a vehicle, which comprises a motor that generates a motor torque for driving the vehicle; a vehicle speed sensor that detects a vehicle speed; an accelerator opening detector that detects an accelerator opening of an accelerator of the vehicle; a brake depression detector that detects a brake manipulated quantity of a brake of the vehicle; and a control unit that is coupled to the motor, the vehicle speed sensor, the accelerator opening detector, and the brake depression detector. The control unit is arranged to bring the motor torque to zero when first, second and third conditions are satisfied wherein the first condition is that the vehicle speed is lower than a predetermined speed, the second condition is that the accelerator opening is substantially zero, and the third condition is that the brake manipulated quantity is increasing, and to generate the motor torque according to the brake manipulated quantity when the brake manipulated quantity is deceasing.

A further aspect of the present invention resides in a method of controlling a motor torque of a motor for driving a vehicle, which comprises an operation of detecting a vehicle speed; an operation of detecting an opening of an accelerator of the vehicle; an operation of detecting a brake manipulated quantity; an operation of bringing the motor torque to zero when the vehicle speed is lower than a predetermined speed, when the accelerator opening is substantially zero, and when the brake manipulated quantity is increasing; and an operation of generating the motor torque according to the brake manipulated quantity when the brake manipulated quantity is decreasing.

The other objects and features of this invention will become understood from the following description with reference to the accompanying drawings.

DETAILED DESCRIPTION OF THE INVENTION

Figure 1:
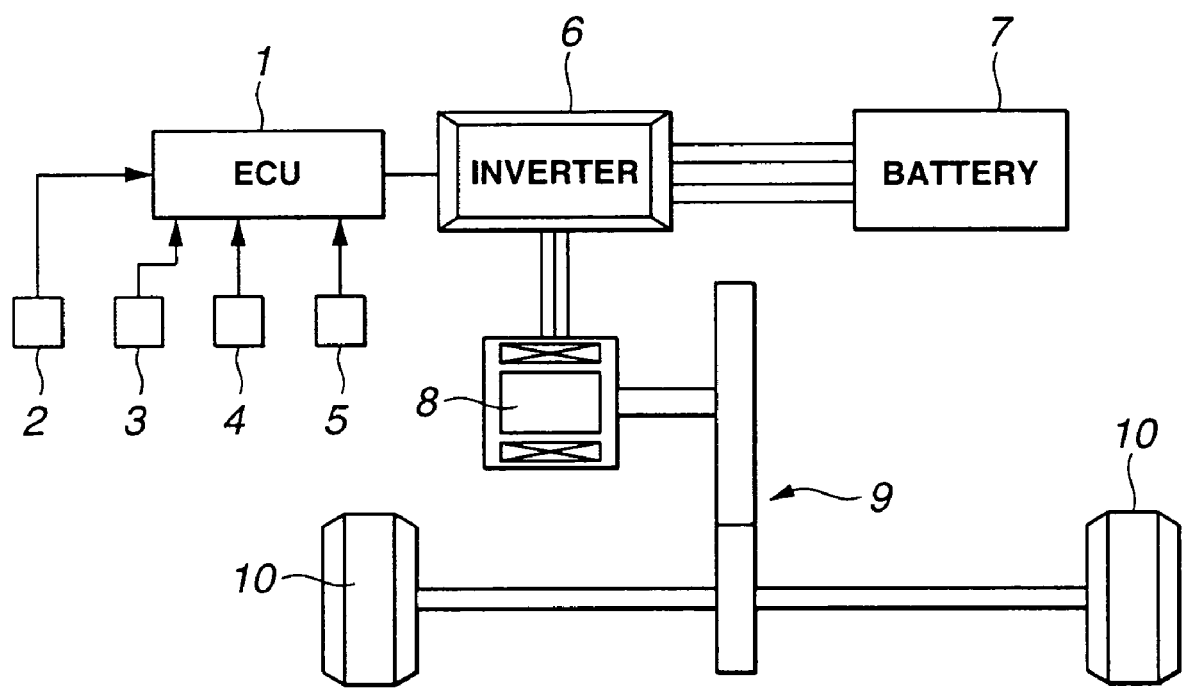
FIG. 1 is a schematic view showing a torque control system for a vehicle according to a first embodiment of the present invention.
Figure 2:
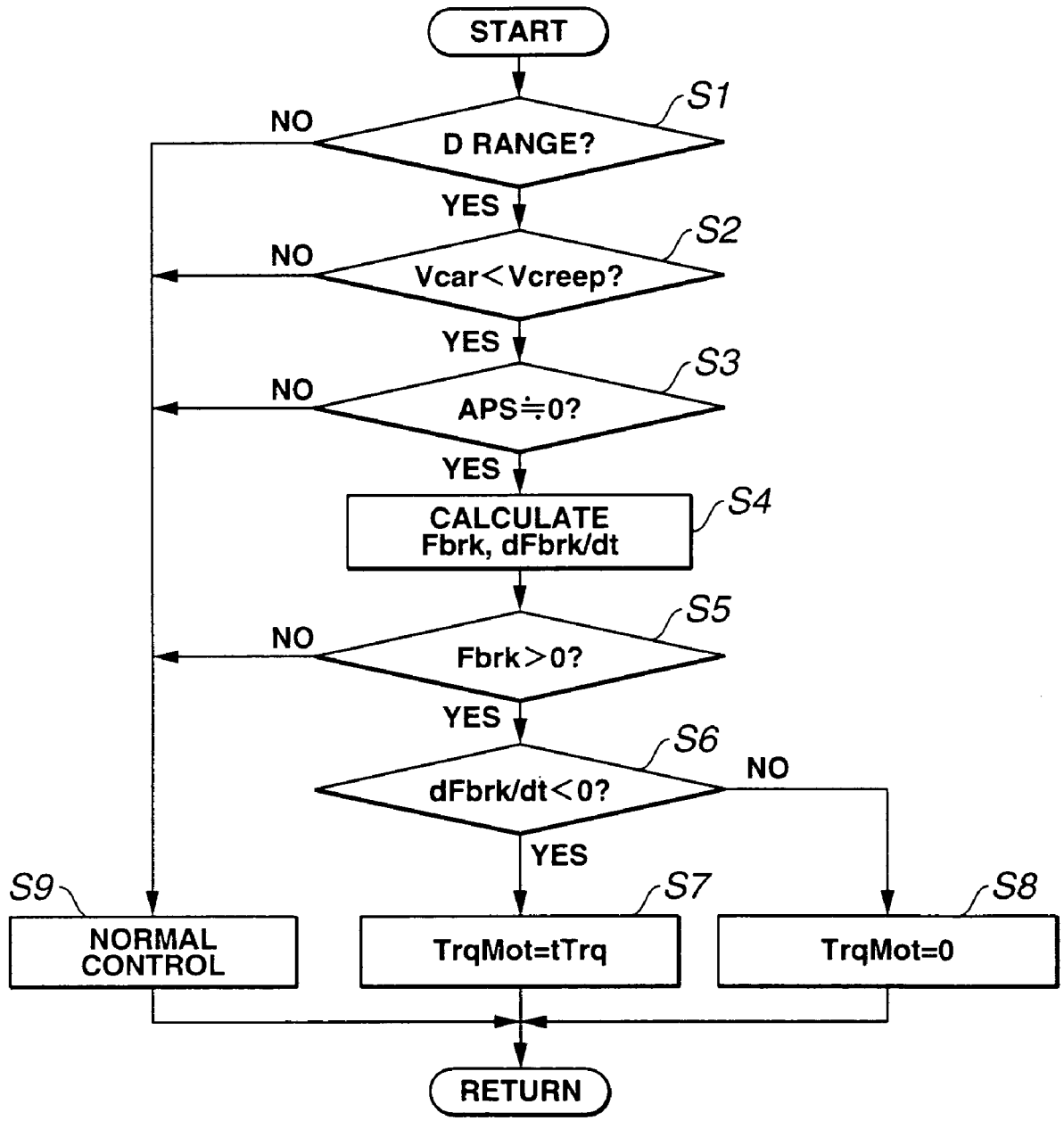
FIG. 2 is a flowchart showing a control executed by the torque control system according to the first embodiment.
Figure 3:
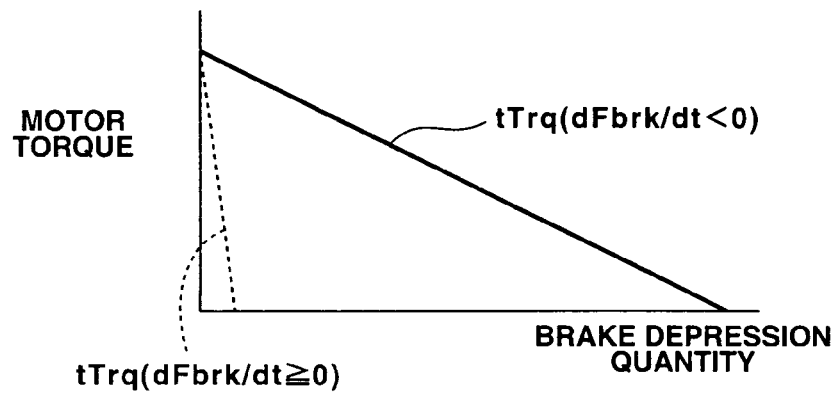
FIG. 3 is a graph showing a relationship between a brake depression quantity and a motor torque, which is employed in the first embodiment.

Referring to FIGS. 1 through 3, there is discussed a first embodiment of a motor torque control system according to the present invention.

As shown in FIG. 1, an engine control unit (ECU) 1 is coupled to a vehicle speed sensor 2 functioning as vehicle speed detecting means for detecting a vehicle speed Vcar, an accelerator opening sensor 3 functioning as accelerator opening detecting means for detecting an accelerator opening Aps, a shift position detecting sensor 4 functioning as a shift position detecting means for detecting a shift position of a shift lever (not shown), and a brake stroke sensor 5 functioning as a brake depression state detecting means for detecting a depression state of a brake pedal (not shown), such as a brake depression quantity (brake manipulated quantity) Fbrk. ECU 1 receives signals from these sensors 2, 3, 4, and 5, and calculates a motor torque command value TrqMot using these input signals.

The motor torque command value TrqMot calculated in ECU 1 is outputted to an inverter 6. Inverter 6 converts direct current supplied from a battery 7 into three-phase alternating current according to the motor torque command value, and supplies the converted alternating current to a motor 8. Motor 8 converts the three-phase alternating current into a drive torque and transmits the torque to tires 10 through a speed reducer 9.

Vehicle speed sensor 2 detects a revolution speed of tires 10 and calculates vehicle speed Vcar from the detected revolution speed of the tire. Accelerator opening sensor 3 is attached to an accelerator pedal (not shown) and converts a manipulation quantity (depression quantity) of the accelerator pedal into a corresponding voltage indicative of accelerator opening Aps. Shift position detecting sensor 4 detects a shift position selected by operating a shift lever which is capable of selecting a parking position (P), a neutral position (N), a reverse position (R) and a drive position (D). Brake stroke sensor 5 detects a hydraulic pressure in a brake conduit (not shown) of a brake system and converts the hydraulic pressure into brake depression quantity Fbrk of a brake pedal. The brake depression quantity takes a positive value, and the magnitude of the braking force increases as the brake depression quantity increases.

FIG. 2 shows a flowchart indicative of the control executed by the torque control system of the first embodiment.

At step S1 engine control unit (ECU) 1 determines whether or not the shift lever is set at D range (drive position). When the determination at step S1 is affirmative, the program proceeds to step S2 When the determination at step S1 is negative, the program proceeds to step S9 wherein ECU 1 executes a normal control.

At step S2 ECU 1 determines whether or not vehicle speed Vcar is smaller than a preset creep-running speed threshold Vcreep. When the determination at step S2 is affirmative (Vcar<Vcreep), the program proceeds to step S3. When the determination at step S2 is negative (Vcar≧Vcreep), the program proceeds to step S9.

At step S3 ECU 1 determines whether or not accelerator opening Aps is generally equal to 0. When the determination at step S3 is affirmative (Aps≈0), the program proceeds to step S4. When the determination at step S3 is negative (Aps≠0), the program proceeds to step S9.

At step S4 subsequent to the affirmative determination at step S3, ECU 1 reads brake depression quantity Fbrk and calculates a differential dFdrk/dt of brake depression quantity Fbrk.

At step S5 subsequent to the execution of step S4, ECU 1 determines whether or not brake depression quantity Fbrk is greater than 0. When the determination at step S5 is affirmative (Fbrk>0), the program proceeds to step S6. When the determination at step S5 is negative (Fbrk≦0), the program proceeds to step S9.

At step S6 ECU 1 determines whether or not differential dFdrk/dt is a negative value. When the determination at step S6 is affirmative (dFdrk/dt<0), that is, when ECU 1 determines that a driver is now releasing a brake pedal to start running the vehicle, the program proceeds to step S7 wherein ECU 1 sets the torque command value TrqMot at a torque tTrq corresponding to brake depression quantity Fbrk on the basis of a continuous line in FIG. 3. This continuous line in FIG. 3 shows a relationship between motor torque tTrq and brake depression quantity Fbrk under a condition that dFbrk/dt<0. On the other hand, when the determination at step S6 is negative (dFdrk/dt≧0), the program proceeds to step S8 wherein ECU 1 changes the motor torque command value TrqMot from a creep-running target torque TrqCreep to 0 (motor torque command value TrqMot=0). The change at step S8 may be executed to suddenly change the motor torque command value TrqMot from creep-running target torque TrqCreep to 0, or may gradually change to 0 with a desired gradient as shown by a broken line shown in FIG. 3.

With the thus arranged torque control system for a vehicle, when the differential of the brake depression quantity is positive, that is, when the brake depression state is in a condition that the braking force is increasing, ECU 1 determines that the driver intends to stop the vehicle, and quickly brings the motor torque command value TrqMot at 0. This arrangement according to the present invention suppresses an excess electric-power consumption.

Further, when the vehicle starts running on a steep upslope, the differential of the brake depression quantity takes a negative value, that is, the braking force is being decreased. Therefore, it becomes possible to prevent the backward movement of the vehicle by generating a motor torque according to the brake depression quantity.

By adding a step of determining whether the determination at step S6 as to differential dFbrk/dt is maintained for a predetermined time period, it becomes possible to further stably generate the motor torque even if the differential of the brake depression quantity Fbrk is fluctuated between positive and negative values by a play of the brake pedal, a depression matter of the brake pedal or vibrations.

Subsequently, there is discussed a second embodiment of the motor torque control system according to the present invention.

The second embodiment is specifically arranged to calculate motor torque command value TrqMot on the basis of a variable rate which varies according to the brake depression quantity, and the other control of the second embodiment is basically the same as that of the first embodiment shown by the flowchart in FIG. 2.

Figure 4:
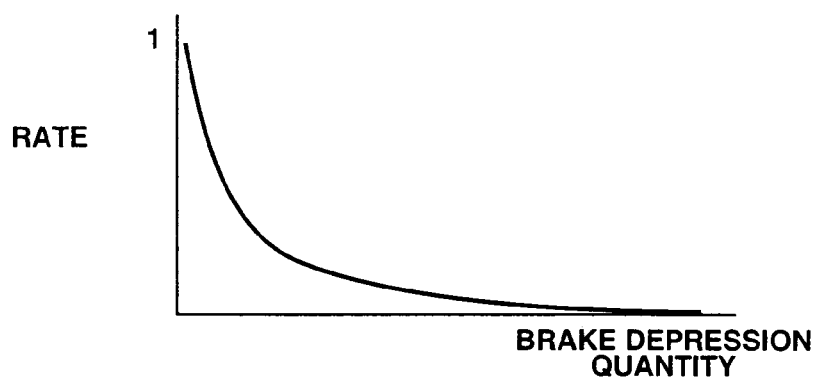
FIG. 4 is a graph showing a relationship between a brake depression quantity and a rate of change thereof, which is employed in a second embodiment.

FIG. 4 shows a relationship between the brake depression quantity and the rate for obtaining motor torque tTrq, and motor torque tTrq for motor torque command value TrqMot is calculated using the following expression (1).

$$tTrq = (tTrqCreep - tTrq_{(n-1)}) \times \text{rate} + tTrq_{(n-1)} \qquad (1)$$

where $tTrq_{(n-1)}$ is the torque obtained in the previous execution, and is set at 0 when dFbrk/dt changes from a positive value to a negative value.

Figure 5:
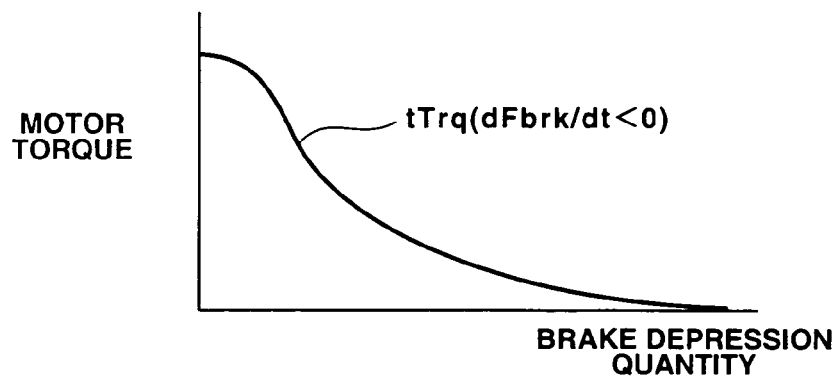
FIG. 5 is a graph showing a relationship between a brake depression quantity and a motor torque, which is employed in the second embodiment.

FIG. 5 shows a relationship between motor torque tTrq obtained from the expression (1). When the brake depression quantity Fbrk is great, the motor torque command is small, that is, the creep torque becomes small. When the brake depression quantity Fbrk is small, the creep torque becomes great.

With the thus arranged second embodiment according to the present invention, when the brake depression quantity Fbrk is great, the rate of change of the motor torque of motor 8 becomes small. Accordingly, by slowly increasing the torque of motor 8, it becomes possible to suppress the generation of rubbing sounds between a brake pad and a disc.

Further, since the rate of change of the torque of motor 8 becomes small under a condition that the brake depression quantity Fbrk is small, it becomes possible to effectively prevent the backward movement of the vehicle at a vehicle start moment on an upslope.

Subsequently, there is discussed a third embodiment of the motor torque control system according to the present invention.

Figure 6:
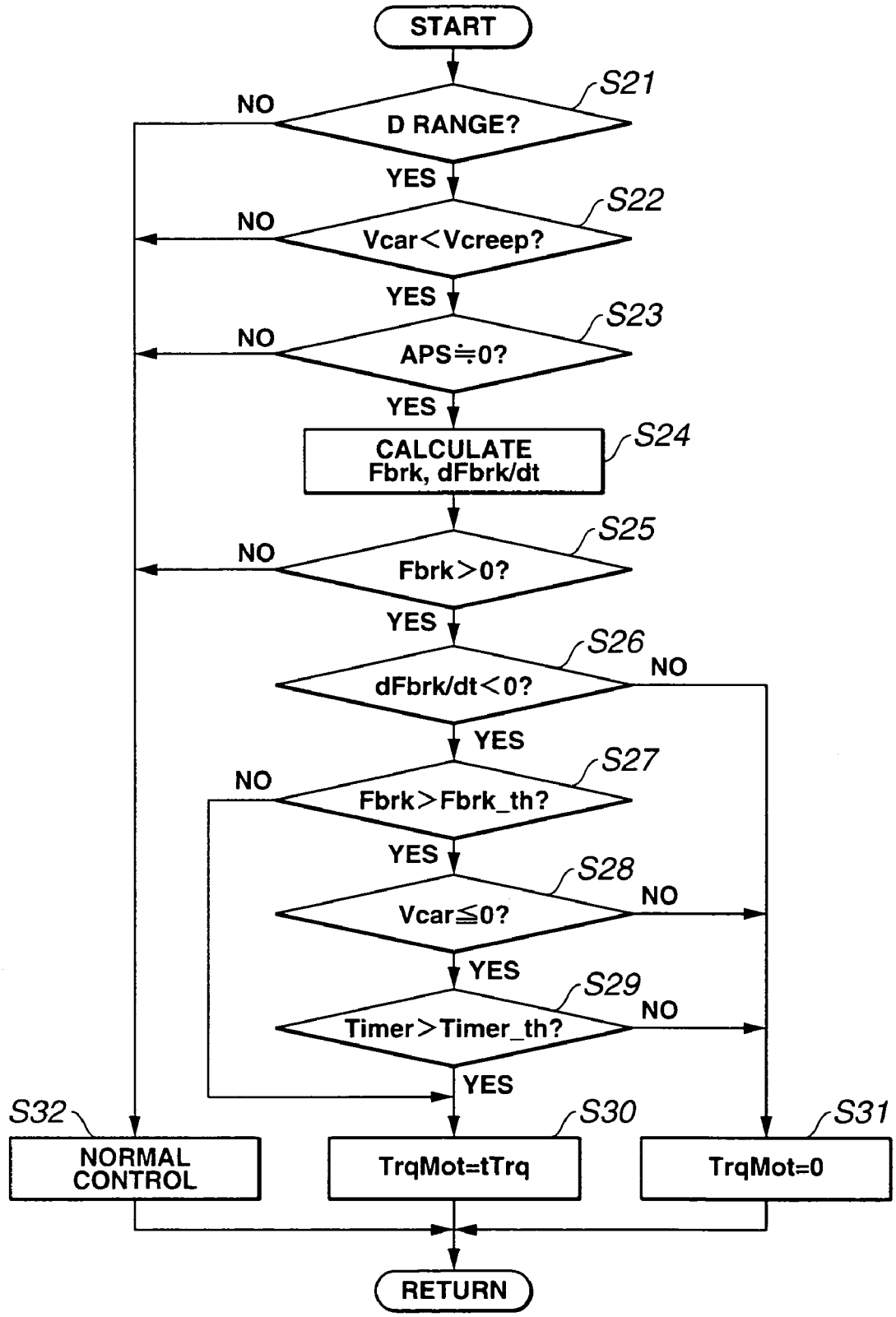
FIG. 6 is a flowchart showing a control executed by the torque control system according to a third embodiment of the present invention.

FIG. 6 is a flowchart showing a control executed by the torque control system according to the third embodiment of the present invention.

At step S21 engine control unit (ECU) 1 determines whether or not the shift lever is set at D range (drive position). When the determination at step S21 is affirmative, that is, when D range is selected, the program proceeds to step S22. When the determination at step S21 is negative, the program proceeds to step S32 wherein ECU 1 executes a normal control.

At step S22 ECU 1 determines whether or not vehicle speed Vcar is smaller than a preset creep-running speed threshold Vcreep. When the determination at step S22 is affirmative (Vcar<Vcreep), the program proceeds to step S23. When the determination at step S22 is negative (Vcar≧Vcreep), the program proceeds to step S32.

At step S23 ECU 1 determines whether or not accelerator opening Aps is generally equal to 0. When the determination at step S23 is affirmative (Aps≈0), the program proceeds to step S24. When the determination at step S3 is negative (Aps≠0), the program proceeds to step S32.

At step S24 subsequent to the affirmative determination at step S23, ECU 1 reads brake depression quantity Fbrk and calculates a differential dFdrk/dt of brake depression quantity Fbrk.

At step S25 subsequent to the execution of step S24, ECU 1 determines whether or not brake depression quantity Fbrk is greater than 1. When the determination at step S5 is affirmative (Fbrk>0), the program proceeds to step S6. When the determination at step S25 is negative (Fbrk≦0), the program proceeds to step S32.

At step S26 ECU 1 determines whether or not differential dFdrk/dt is a negative value. When the determination at step S26 is affirmative (dFdrk/dt<0), the program proceeds to step S27. On the other hand, when the determination at step S26 is negative (dFdrk/dt ≧0), that is, when ECU 1 determines that a driver is now depressing a brake pedal to stop traveling the vehicle, the program proceeds to step S31 wherein ECU 1 changes the motor torque command value TrqMot from creep-running target torque TrqCreep to 0 (TrqMot=0). The change at step S31 may be executed to suddenly change motor torque command value TrqMot from creep-running target torque TrqCreep to 0, or may gradually change to 0 with a desired gradient so as to limit the rate of change.

At step S27 ECU 1 determines whether or not brake depression quantity Fbrk is greater than a preset threshold value Fbrk_th. When the determination at step S27 is affirmative (Fbrk>Fbrk_th), the program proceeds to step S28. On the other hand, when the determination at step 27 is negative (Fbrk≦Fbrk_th), the program proceeds to step S30 wherein ECU 1 sets motor torque command value TrqMot at torque tTrq calculated by a method as same as that employed in the first or second embodiment (TrqMot=tTrq).

At step S28 ECU 1 determines whether or not vehicle speed Vcar is smaller than or equal to 0. When the determination at step S28 is affirmative (Vcar≦0), the program proceeds to step S29 wherein ECU 1 starts a counting of a timer TM and determines whether or not a content Timer of timer TM is greater than a predetermined time Timer_th.

When the determination at step S29 is affirmative (Timer>Timer_th), ECU 1 determines that the vehicle is in a stop state, and the program proceeds to step S30. On the other hand, when the determination at step S29 is negative (Timer≦Timer_th), the program proceeds to step S31.

With the thus arranged third embodiment according to the present invention, even if the braking is slight slowed at a moment just before the vehicle stops running in order to soften a shock due to vehicle stop, motor 8 does not generate a torque as far as the vehicle run stop condition is confirmed. This enables the smooth run stop of the vehicle.

Further, with the thus arranged third embodiment, even if the depression of the brake pedal is largely decreased to again accelerate the vehicle at a moment just before the vehicle stops running, motor 8 generates a torque regardless of the vehicle speed. This enables the smooth acceleration under a condition that a re-acceleration is executed at a moment just before the vehicle stops running.

Figure 7:
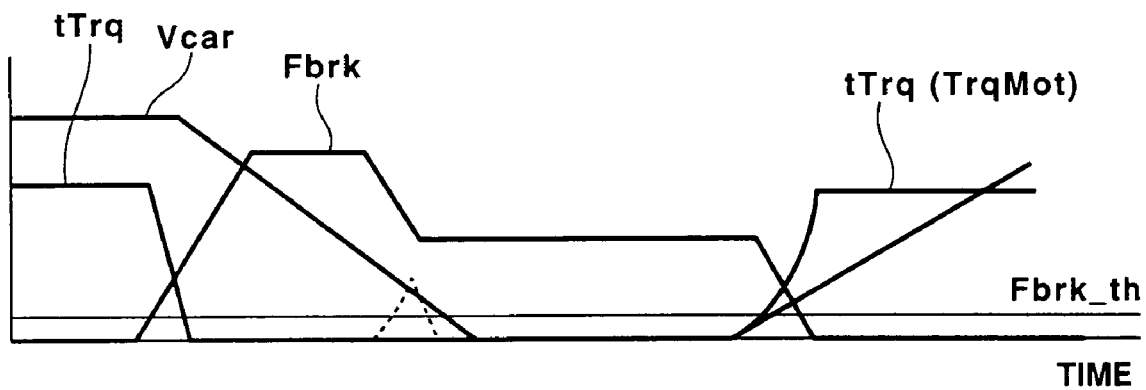
FIG. 7 is a graph showing time-series changes of tTrq, Fbrk and Vcar, employed for explaining advantages of the third embodiment.

Herein, there is discussed an inherent advantages of the third embodiment with reference to FIG. 7 which shows time-series changes of motor torque (motor torque command value) tTrq (TrqMot), brake depression quantity Fbrk and vehicle speed Vcar. When the vehicle just stops running, the motor torque tTrq of motor 8 is rapidly brought to 0. When the brake depression quantity Fbrk is decreased to start running the stopped vehicle, motor 8 generates a torque according to brake depression quantity Fbrk. Accordingly, it becomes possible to decrease electric-power consumption without degrading the drivability during the creep running. Further, even if brake depression quantity Fbrk is slightly decreased at a moment just before the vehicle stops running, due to the greater magnitude of brake depression quantity Fbrk relative to Fbrk_th (Fbrk>Fbrk_th), the vehicle smoothly stops running without generating the torque at motor 8 as shown by a broken line in FIG. 7.

Figure 8:
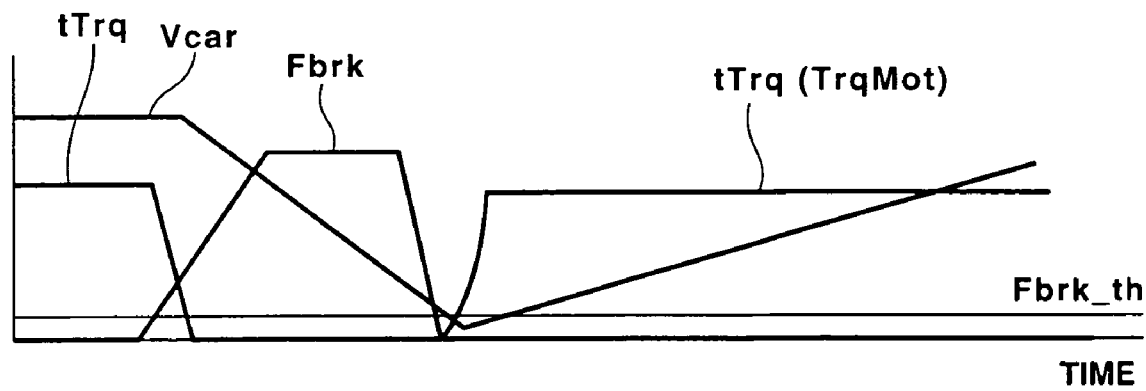
FIG. 8 is a graph showing time-series changes of tTrq, Fbrk and Vcar, employed for explaining advantages of the third embodiment.

Further, when brake depression quantity Fbrk is decreased to again accelerate the vehicle at a moment just before the vehicle stops running as shown in FIG. 8, motor 8 generates a torque at a moment that brake depression quantity Fbrk becomes smaller than Fbrk_th (Fbrk<Fbrk_th) regardless of vehicle speed Vcar. This enables the smooth acceleration of the vehicle under this condition.

Although the embodiments according to the present invention have been shown and described to be adopted to an electric vehicle, the invention is not limited to this and may be adopted to a common vehicle which executes a creep running by a motor.

Hereinafter, there is discussed the concept of the present invention and the advantaged gained thereby.

(1) The motor torque control system according to the present invention is capable of generating a creep torque at least by a motor, and comprises a vehicle speed detecting means for detecting a vehicle speed, an accelerator opening detecting means for detecting an accelerator opening and a brake depression state detecting means for detecting a brake depression state. When the vehicle speed is smaller than a predetermined speed and when the accelerator opening is almost zero, the motor torque is rapidly brought to 0 in case that the brake depression quantity is increasing, and the motor toque is generated according to the brake depression quantity in case that the brake depression quantity is decreasing. With this arrangement, when the brake depression quantity is increasing, it is determined that the driver intends to stop a running of the vehicle and the motor torque is rapidly brought to 0. This arrangement enables the excessive electric power consumption. Further, when the vehicles starts running on an upslope, the brake depression quantity is decreased so as to decrease the brake force. This generates the motor torque according to the brake depression quantity, and therefore the back movement of the vehicle is prevented.

(2) In addition to the arrangement described in the above paragraph (1), the motor torque control system is further arranged to control the motor torque when one of the braking increasing state and the braking decreasing state is maintained for a predetermined time period. With this arrangement, even if the brake depression state fluctuates to the direction of increasing the braking force or to the direction of decreasing the braking force, due to a play of a brake pedal, a depression manner of the brake and vibrations, it becomes possible to stably generate the motor torque.

(3) In addition to the arrangement described in the above paragraph (1) or (2), the motor torque control system according to the present invention is further arranged to increase a rate of change of the motor torque according to the increase of the brake depression quantity when the brake depression state is set at the braking decreasing state. With this arrangement, when the brake depression quantity is large, a rate of change of the motor torque becomes smaller. Therefore, the motor torque slowly increases, and thereby suppressing the generation of rubbing sounds between a brake pad and a disc.

(4) In addition to the arrangement described in the above paragraph (3), the motor torque control system according to the present invention is further arranged to generate the motor torque only when the brake depression quantity is greater than a predetermined value and when the vehicle stop state is maintained for a predetermined time period, and the control unit generates the motor torque regardless of the vehicle speed when the brake depression quantity is smaller than or equal to the predetermined value. With this arrangement, even if the brake is slightly released at a moment just before the vehicle stops running to soften the shock due to the braking, the motor torque is not generated without a vehicle run stop. This enables a smooth vehicle run stop. Further, when the brake is largely released at a moment just before the vehicle run stop to again accelerate the vehicle, the motor torque is generated regardless of the vehicle speed. This enables smooth acceleration of the vehicle.

This application is based on Japanese Patent Application No. 2003-108601 filed on Apr. 14, 2003 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A motor torque control system for a vehicle equipped with a motor, comprising:
a vehicle speed sensor that detects a vehicle speed;
an accelerator opening detector that detects an opening of an accelerator of the vehicle;
a brake depression detector that detects a brake depression quantity indicative of a depression state of a brake of the vehicle; and
a control unit coupled to the vehicle speed sensor, the accelerator opening detector, and the brake depression detector, the control unit being arranged to bring a motor torque of the motor to zero when the vehicle speed is lower than a predetermined speed, when the accelerator opening is substantially zero, and when a differential of the brake depression quantity is positive, and to generate motor torque according to the brake depression quantity when the differential of the brake depression quantity is negative.

2. The motor torque control system as claimed in claim 1, wherein the control unit is further arranged to control the motor torque when the differential of the brake depression quantity is maintained as positive or negative for a predetermined time period.

3. The motor torque control system as claimed in claim 1, wherein the control unit is further arranged to increase a rate of change of the motor torque according to an increase of the brake depression quantity when the differential of the brake depression quantity is negative.

4. The motor torque control system as claimed in claim 3, wherein the control unit is further arranged to generate the motor torque under the braking decreasing state only when the brake depression quantity is greater than a predetermined value and when a vehicle stop state is maintained for a predetermined time period, and to generate the motor torque regardless of the vehicle speed when the brake depression quantity is smaller than or equal to the predetermined value.

5. The motor torque control system as claimed in claim 1, wherein the control unit is further arranged to determine the motor torque tTrq generated according to the brake depression quantity from the following expression (1):

$$tTrq = (tTrqCreep - tTrq_{(n-1)}) \times \text{rate} + tTrq_{(n-1)} \quad (1)$$

where $tTrq_{(n-1)}$ is a torque obtained in a previous execution, tTrqCreep is a creep running target torque, and rate is a variable which decreases from 1 to 0 in approximately inverse proportion according to an increase of the brake depression quantity.

6. The motor torque control system as claimed in claim 1, wherein the control unit is further arranged to bring the motor torque to zero with a steep gradient of the motor torque to the brake depression quantity which is largely steeper than a gradient of the motor torque to the brake depression quantity, which is employed when the differential of the brake depression quantity is negative.

7. A method of controlling a motor torque of a motor for driving a vehicle, comprising:
detecting a vehicle speed;
detecting an opening of an accelerator of the vehicle;
detecting a brake depression quantity of a brake of the vehicle;
bringing the motor torque to zero when the vehicle speed is lower than a predetermined speed, when the accelerator opening is substantially zero, and when a differential of the brake depression quantity is positive; and generating the motor torque according to the brake depression quantity when the differential of the brake depression quantity is negative.

8. A motor torque control system for a vehicle, comprising:
- a motor that generates a motor torque for driving the vehicle;
- a vehicle speed sensor that detects a vehicle speed;
- an accelerator opening detector that detects an accelerator opening of an accelerator of the vehicle;
- a brake depression detector that detects a brake depression quantity of a brake of the vehicle; and
- a control unit coupled to the motor, the vehicle speed sensor, the accelerator opening detector, and the brake depression detector, the control unit being arranged to bring the motor torque to zero when first, second and third conditions are satisfied,
- wherein the first condition is that the vehicle speed is lower than a predetermined speed, the second condition is that the accelerator opening is substantially zero, and the third condition is that a differential of the brake depression quantity is positive, and
- wherein the control unit is arranged to generate the motor torque according to the brake depression quantity when the differential of the brake depression quantity is negative.

9. A motor torque control system for a vehicle equipped with a motor, comprising:
- vehicle speed detecting means for detecting a vehicle speed;
- accelerator opening detecting means for detecting an opening of an accelerator of the vehicle;
- brake depression detecting means for detecting a brake depression quantity indicative of a depression state of a brake of the vehicle;
- first controlling means for bringing a motor torque of the motor to zero when the vehicle speed is lower than a predetermined speed, when the accelerator opening is substantially zero, and when a differential of the brake depression quantity is positive; and
- second controlling means for generating the motor torque according to the brake depression quantity when the differential of the brake depression quantity is negative.

* * * * *